US009483912B2

(12) United States Patent
Melnick et al.

(10) Patent No.: US 9,483,912 B2
(45) Date of Patent: Nov. 1, 2016

(54) ELECTRONIC GAMING DEVICE WITH REPEAT PAYLINE FUNCTIONALITY

(75) Inventors: Scott Andrew Melnick, Decatur, GA (US); Mauro Alejandro Franic, Alpharetta, GA (US); Godfrey Omoregie Imudia, Grayson, GA (US)

(73) Assignee: Cadillac Jack, Inc., Duluth, GA (US)

( * ) Notice: Subject to any disclaimer, the term of this patent is extended or adjusted under 35 U.S.C. 154(b) by 226 days.

(21) Appl. No.: 13/569,685

(22) Filed: Aug. 8, 2012

(65) Prior Publication Data

US 2014/0045570 A1 Feb. 13, 2014

(51) Int. Cl.

*G06F 17/00* (2006.01)
*G06F 19/00* (2011.01)
*G07F 17/32* (2006.01)

(52) U.S. Cl.

CPC ....... *G07F 17/3258* (2013.01); *G07F 17/3244* (2013.01); *G07F 17/3262* (2013.01); *G07F 17/3267* (2013.01); *G07F 17/3286* (2013.01)

(58) Field of Classification Search

CPC ............... G07F 17/32; G07F 17/3227; G07F 17/3244; G07F 17/3258; G07F 17/326; G07F 17/3262; G07F 17/3267; G07F 17/3286

USPC ....................... 463/11–13, 16–20, 25, 29–31

See application file for complete search history.

(56) References Cited

U.S. PATENT DOCUMENTS 6,077,163 A * 6/2000 Walker et al. .................. 463/26
2003/0114217 A1* 6/2003 Walker et al. .................. 463/20
2004/0038724 A1* 2/2004 Asdale .................... G07F 17/34 463/20
2004/0053657 A1* 3/2004 Fiden ................. G07F 17/3227 463/16
2007/0054726 A1* 3/2007 Muir ....................... G07F 17/34 463/16
2007/0161424 A1* 7/2007 Gatto et al. ..................... 463/20
2009/0111557 A1* 4/2009 Jankowski ...................... 463/20
2013/0310137 A1* 11/2013 Tongate et al. ................. 463/20

* cited by examiner

*Primary Examiner* — Milap Shah

(74) *Attorney, Agent, or Firm* — Weide & Miller, Ltd.

(57) ABSTRACT

Examples disclosed herein relate to systems and methods, which may receive wagers on one or more repeat paylines. The systems and methods may receive one or more secondary wagers on one or more repeat paylines. The repeat paylines may be based on data received from a player. The systems and methods may determine a repeat paylines payout based on the one or more repeat paylines.

15 Claims, 17 Drawing Sheets

570

| PAYLINE | NUMBER OF SPINS | PAYOUTS |
|---|---|---|
| PAYLINE 1 | 1 | 5X, 10 FREE SPINS, AND/OR 1000 CREDITS |
| PAYLINE 1 | 5 | 2X, 5 FREE SPINS, AND/OR 500 CREDITS |
| PAYLINE 2 | 3 | 4X, 20 FREE SPINS, AND/OR 750 CREDITS |
| PAYLINE 2 | 10 | 2X, 7 FREE SPINS, AND/OR 250 CREDITS |
| PAYLINE 3 | 15 | 3X, 12 FREE SPINS, AND/OR 100 CREDITS |
| PAYLINE N | 7 | 4X, 8 FREE SPINS, AND/OR 150 CREDITS |

570

| PAYLINE | NUMBER OF SPINS | PAYOUTS |
|---|---|---|
| PAYLINE 1 | 1 | 5X, 10 FREE SPINS, AND/OR 1000 CREDITS |
| PAYLINE 1 | 5 | 2X, 5 FREE SPINS, AND/OR 500 CREDITS |
| PAYLINE 2 | 3 | 4X, 20 FREE SPINS, AND/OR 750 CREDITS |
| PAYLINE 2 | 10 | 2X, 7 FREE SPINS, AND/OR 250 CREDITS |
| PAYLINE 3 | 15 | 3X, 12 FREE SPINS, AND/OR 100 CREDITS |
| PAYLINE N | 7 | 4X, 8 FREE SPINS, AND/OR 150 CREDITS |

FIG. 5D

572

| PATTERN | TIME | PAYOUTS |
|---|---|---|
| PAYLINES 1 AND 2 | 5 MINUTES | MULTIPLIER, FREE SPINS, AND/OR CREDITS |
| PAYLINES 3, 5, AND 7 | 10 MINUTES | MULTIPLIER, FREE SPINS, AND/OR CREDITS |
| FOUR CORNERS | 30 MINUTES | MULTIPLIER, FREE SPINS, AND/OR CREDITS |
| FULL BOARD | 120 MINUTES | MULTIPLIER, FREE SPINS, AND/OR CREDITS |
| PAYLINES 1, 3, 5, 6, 7, AND 10 | 15 MINUTES | MULTIPLIER, FREE SPINS, AND/OR CREDITS |
| A CENTER SQUARE | 20 MINUTES | MULTIPLIER, FREE SPINS, AND/OR CREDITS |

FIG. 5E

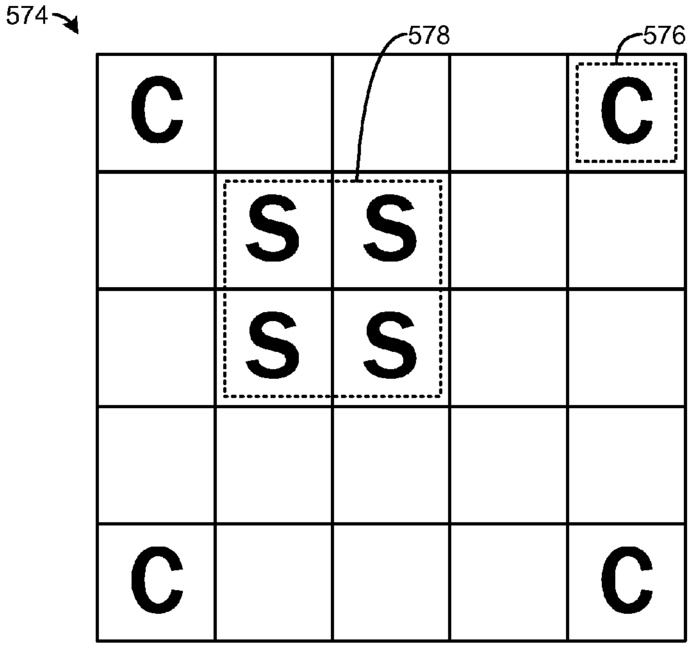

610

WINNING EVENTS BY PAYLINE

| | |
|---|---|
| PAYLINE 1 | 30% |
| PAYLINE 2 | 20% |
| PAYLINE 3 | 10% |
| PAYLINE 4 | 18% |
| PAYLINE 5 | 12% |
| PAYLINE N[TH] | 5% |
| FOUR CORNERS | 5% |

FIG. 6C

620

| | | | | |
|---|---|---|---|---|
| 10 | 18 | 42 | 49 | 75 |
| 3 | 22 | 35 | 45 | 70 |
| 9 | 21 | FREE | 51 | 64 |
| 5 | 30 | 40 | 56 | 63 |
| 13 | 23 | 44 | 53 | 61 |

622

624

FIG. 6D

630

| PAYLINE | COMPLETED | TIME REMAINING |
|---|---|---|
| 1 | YES | 0 |
| 2 | NO | 3 MINUTES |
| 3 | NO | 5 MINUTES |
| 4 | YES | 0 |
| 5 | NO | 10 SECONDS |
| 6 | NO | 20 MINUTES |
| 7 | NO | 50 SECONDS |

FIG. 7B

750

| GAME | JACKPOT SIZE | DATE WON | DAYS | HISTORICAL FREQUENCY OF WINNING | ANTICIPATED WIN DATE |
|---|---|---|---|---|---|
| GAME 1 | $1,000,000 | 1/10/10 | 1400 | ON AVERAGE EVERY 1500 DAYS | 2/18/2014 |
| GAME 2 | $5,000,000 | 1/1/10 | 1410 | ON AVERAGE EVERY 1000 DAYS | 9/27/2012 |
| . . . | . . . | . . . | . . . | . . . | . . . |
| GAME N | $10,000,000 | 12/1/2009 | 1440 | ON AVERAGE EVERY 2000 DAYS | 5/24/2015 |

ELECTRONIC GAMING DEVICE WITH REPEAT PAYLINE FUNCTIONALITY

FIELD

The subject matter disclosed herein relates to an electronic gaming device. More specifically, the disclosure relates to an electronic gaming device, which provides gaming options relating to wagering on repeat paylines. Further, the disclosure relates to generating and displaying information relating to historical frequency of winning an award.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. A new way of delivering game play includes providing gaming options relating to wagering that one or more paylines will be winning paylines again with a specific measurement (e.g., time, spins, etc.). In addition, a new exciting way to show information relating to game play would be to generate and disclose information relating to historical frequency of winning an award.

BRIEF DESCRIPTION OF THE FIGURES

Non-limiting and non-exhaustive examples will be described with reference to the following figures, wherein like reference numerals refer to like parts throughout the various figures.

FIG. 5D is an illustration of a pattern paytable for an electronic gaming device, according to one embodiment.

FIG. 5E is an illustration of symbol payout structures, which can be utilized with the electronic gaming device, according to one embodiment.

FIG. 6C is an illustration of a bingo card matrix, according to one embodiment.

FIG. 6D is an illustration of a game status image, according to one embodiment.

FIG. 7B is a database relating to the historical frequency of winning an award, according to one embodiment.

DETAILED DESCRIPTION

Figure 1:
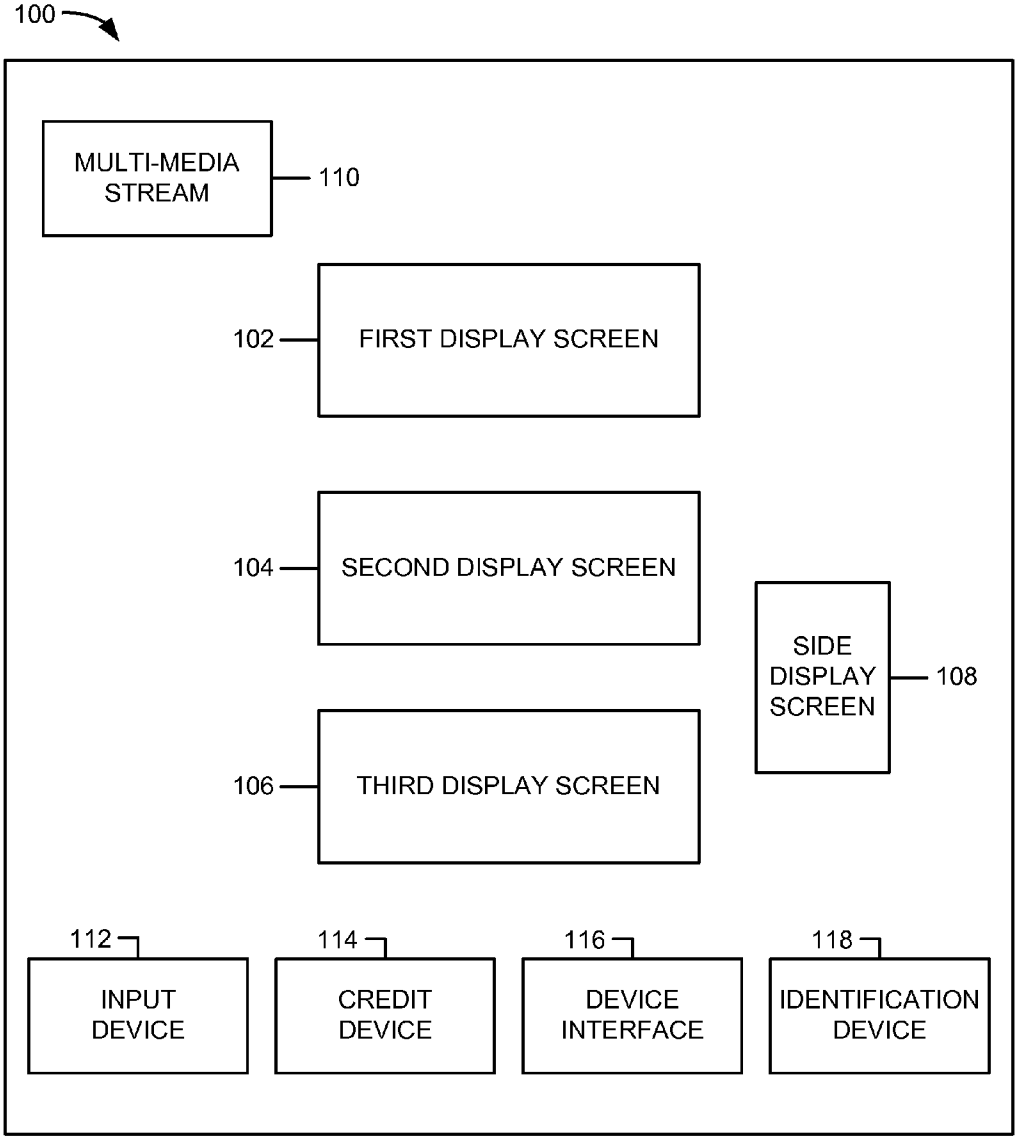
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select one or more repeat payline gaming options, to select one or more pattern gaming options, to obtain data relating to historical payouts, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D")

game play, to select three-dimensional ("3D") game play, to select both two-dimensional and three-dimensional game play, to change the orientation of games in a three-dimensional space, to move a symbol (e.g., wild, multiplier, etc.), or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have repeat payline gaming options only. Therefore, no non-repeat payline gaming options would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
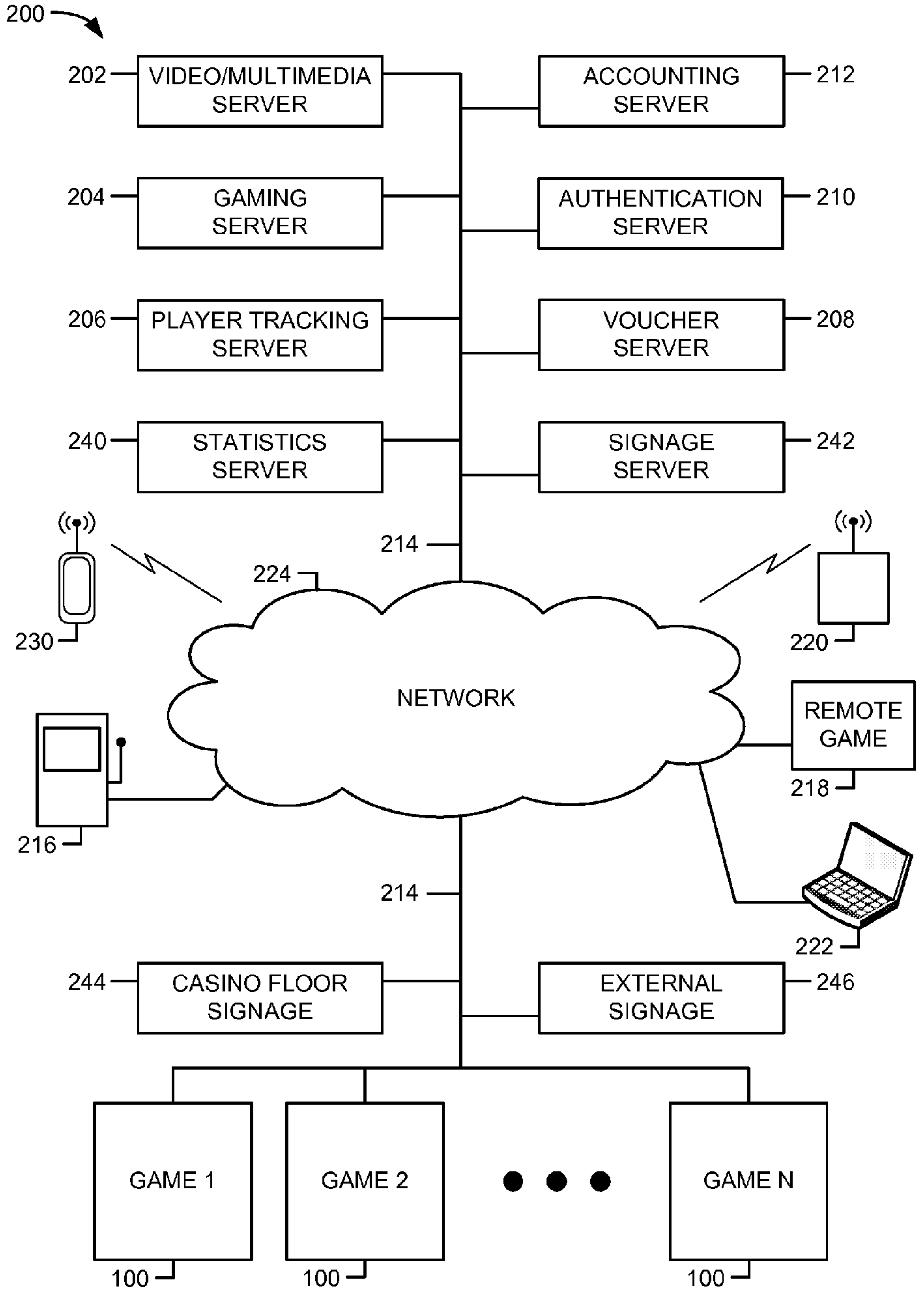
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, a statistics server 240, and a signage server 242.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include repeat payline data, pattern data, historical payout data, columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

Statistics server 240 may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Signage server 242 may be used to generate any image for display on one or more electronic gaming device 100, an internal display device within a gaming entity, an external display device outside of a gaming entity, and/or any combination thereof. Signage server 242 may utilize data from any module, any other server (e.g., statistics server 240, etc.), and/or any other data source to generate images for display on one or more electronic gaming device 100, an internal display device within a gaming entity, an external display device outside of a gaming entity, and/or any combination thereof.

Figure 3:
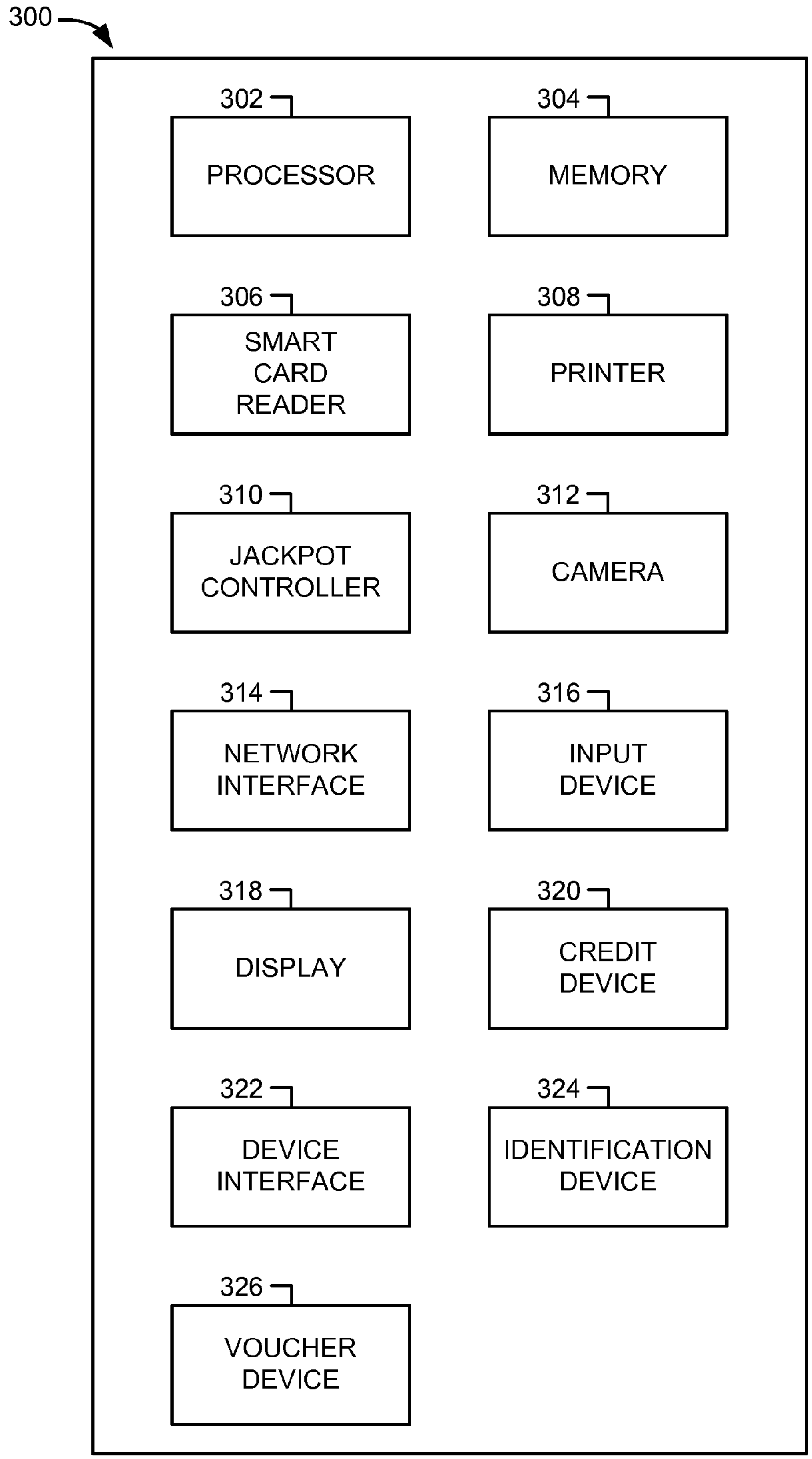
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, accounting server 212, statistics server 240, and/or signage server 242.

Input device 316 may be mechanical buttons, electronic buttons, a touch screen, and/or any combination thereof. Input device 316 may be utilized to make a wager, to make an offer to buy or sell a voucher, to determine a vouchers worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
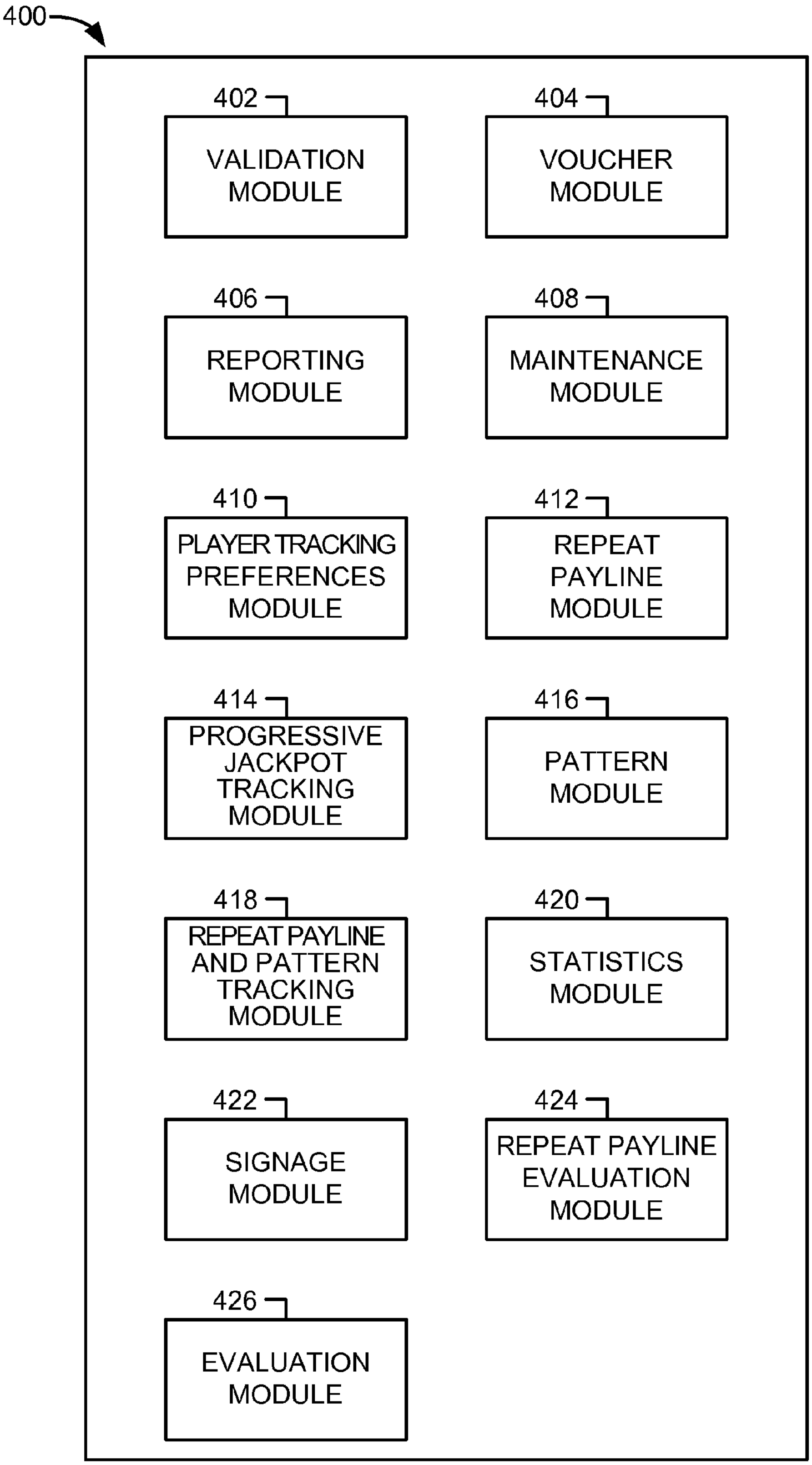
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a repeat payline module 412, a progressive jackpot tracking module 414, a pattern module 416, a repeat payline and pattern tracking module 418, a statistics module 420, a signage module 422, a repeat payline evaluation module 424, and/or an evaluation module 426.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Repeat payline module 412 may store various repeat payline structures relating to game results and/or game play. For example, repeat payline structures may include one-to-five winning symbols (e.g., symbols that form a winning combination) in a row; one-to-five winning symbols in a column; one or more winning symbols in a first row, one or more winning symbols in a third row, and one or more winning symbols in a five row; one winning symbol in a first column, one winning symbol in a second column, one winning symbol in a fourth column, and one winning symbol in a fifth column; one winning symbol in a first row, one winning symbol in the second row, one winning symbol in a third row, and one winning symbol in a fifth row; and/or any combination that utilizes one or more spaces on one or more reels utilized by electronic gaming device 100 and/or electronic gaming system 200. Repeat payline module 412 may include a payline module and a repeat payline module. Payline module may be a separate module. The payline module may include a plurality of payline structures.

Progressive jackpot tracking module 414 may be utilized to track jackpots (e.g., progressive and/or non-progressive) to generate reports and/or images. Progressive jackpot tracking module 414 may be utilized with other module and/or servers (e.g., statistics server 240, etc.) to generate reports and/or images. For example, progressive jackpot tracking module 414 may obtain data (e.g., a recent winning event) from a first gaming machine and transfer this data to statistics server 240. Statistics server 240 may utilize this first gaming machine recent winning event data to update any of the historical data relating to one or more progressive jackpots, one or more non-progressive jackpots, and/or any gaming data relating to the first gaming machine.

Pattern module 416 may be used to store data relating to repeat payline patterns. For example, a first payline may generate a winning event every ten spins on average. In this example, the mean winning event for the first payline may be every twelve spins. The longest span without a winning event for the first payline may be thirty spins. The shortest span without a winning event for the first payline may be one spin.

Pattern module 416 may include data relating to one or more interactions between one or more paylines. For example, when the first payline has a winning event, thirty percent of the time second payline has a winning event within three spins. In another example, when the first payline has a winning event, five percent of the time second payline also has a winning event. In another example, when the first payline has a winning event and the second payline has a winning event during the same spin, then the third payline has a winning event within five spins. Any interaction criteria may be generated between one or more paylines.

Repeat payline and pattern tracking module 418 may maintain data relating to historical game play relating to one or more repeat payline game results. The maintained data may include data which may be utilized to generate patterns for one or more paylines. Data from repeat payline and pattern tracking module 418 may be utilized by pattern module 416 to generate one or more patterns, interaction data, winning percentages, and/or any other logic data relating to the maintained data.

Statistics module 420 may be used to maintain data relating to historical game play for electronic gaming device 100. Further, the historical game play data from one or more other electronic gaming devices 100 may be stored on one or more other electronic gaming devices 100. This data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Signage module 422 may be used to generate any image for display on electronic gaming device 100, an internal display device within a gaming entity, an external display device outside of a gaming entity, and/or any combination thereof. Signage module 422 may utilize data from any module, any other server (e.g., statistics server 240 and/or signage server 242), and/or any other data source to generate images for display on electronic gaming device 100, an internal display device within a gaming entity, an external display device outside of a gaming entity, and/or any combination thereof.

Repeat payline evaluation module 424 may determine payouts related to repeat payline game results (or pattern results) when there are one or more repeat payline gaming options selected by a player. For example, processor 302 via repeat payline evaluation module 424 may determine that a repeat payline wager has generated a winning event.

Evaluation module 426 may determine payouts related to game results when there are no repeat payline gaming options employed.

It should be noted that repeat payline evaluation module 424 and evaluation module 426 may be combined into one module. Further, there may be one evaluation module where the determined payout does not depend on whether there were any wild symbols, scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
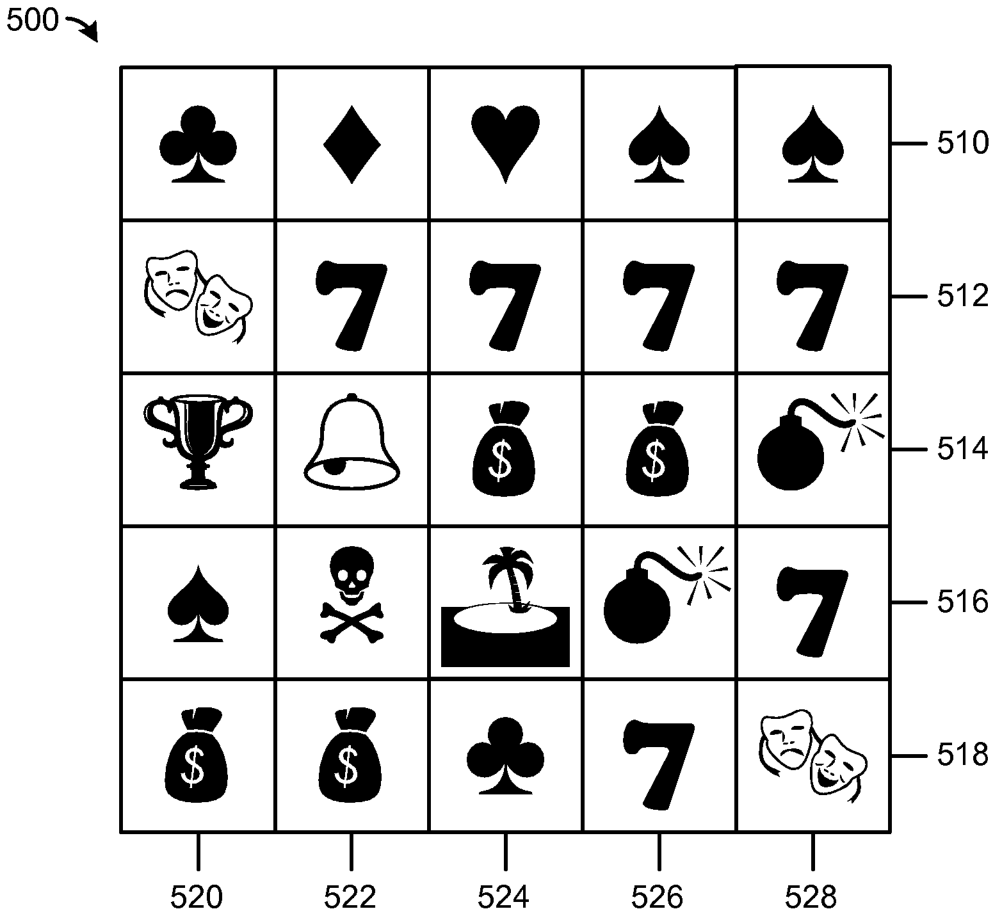
FIG. 5A is an illustration of a matrix including a plurality of reels, according to one embodiment.

FIG. 5A shows a screen image 500 for electronic gaming device 100 on display 318. Screen image 500 may include a predetermined number of columns (e.g., 520, 522, 524, 526, 528, etc.) and a predetermined number of rows (e.g., 510, 512, 514, 516, 518, etc.). Screen image 500 may include any number of rows and any number of columns. For example, screen image 500 may have five rows and ten columns; screen image 500 may have eight rows and thirteen columns, or any other combinations of rows and columns. The player may initiate a wagering event through input device 316. Images in each cell may scroll up and/or down and/or side-to-side. Positioning of the images displayed in the reels on screen image 500 may display the outcome of a wagering event (e.g. a win or a loss for the player).

For example, it may be that if all columns in a first row 510 have the same image (e.g., cherries, bars, pictures of the player as captured by camera 312, etc.) then a winning event has occurred. Lining up of the images may happen in one of many ways. For example, if all images in the various cells, which are touching by a shared side or by a corner, have the same image this may represent that a winning event has occurred.

Figures 5B, 5C:
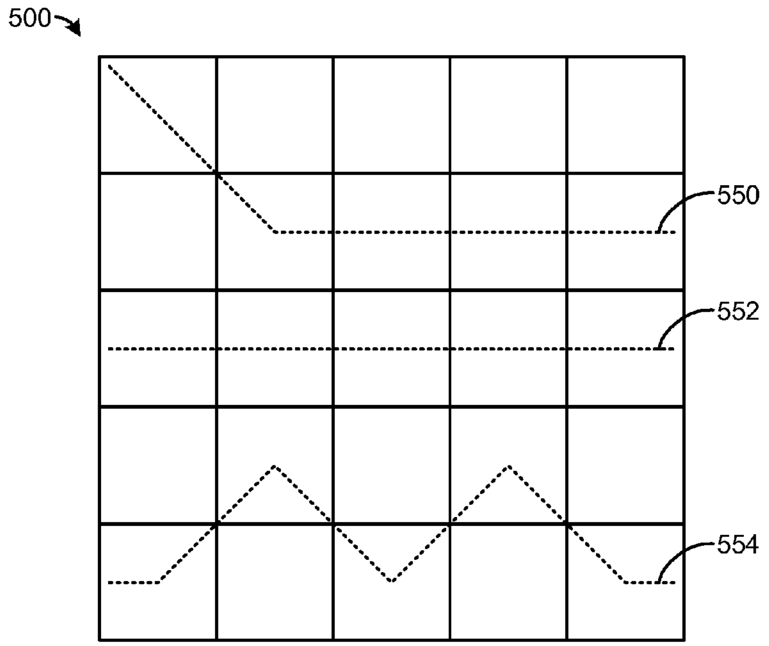
FIG. 5B is an illustration of paylines of the electronic gaming device, according to one embodiment.
FIG. 5C is an illustration of a repeat payline paytable for an electronic gaming device, according to one embodiment.

FIG. 5B shows an illustration of screen image 500, which may include a first payline 550, a second payline 552, and a third payline 554.

In FIG. 5C, a number of wagering options 570 is shown, according to an exemplary embodiment. For example, a wagering option may be that first payline 550 may be a winning payline within one spin, which may generate a five times multiplier payout, ten free spins, and/or 1,000 additional credits.

In another example, a wagering option may be that first payline 550 may be a winning payline within five spins, which may generate a two times multiplier payout, five free spins, and/or 500 additional credits. The payout for this wagering option may be smaller because the player has a greater chance of winning since first payline 550 only needs to have a winning event once within five spins, whereas in the first example, first payline 550 needed to have a winning event occur during one spin.

In another example, a wagering option may be that second payline 552 may be a winning payline within three spins, which may generate a four times multiplier payout, twenty free spins, and/or 750 additional credits. This payout may be based on a lack of winning events occurring on second payline 552. For example, second payline 552 may not have had a winning event in over 100 spins because of the randomness of a random number generator. Based on the lack of a winning event, electronic gaming device 100 and/or electronic gaming system 200 may increase the payout on second payline 552. In another example, the payouts may be decreased because of a lack of a winning event. In other examples, the payouts may be increased/decreased based on a payline having numerous winning events in a specific time period.

In another example, a wagering option may be that second payline 552 may be a winning payline within ten spins, which may generate a two times multiplier payout, seven free spins, and/or 250 additional credits.

In another example, a wagering option may be that third payline 554 may be a winning payline within fifteen spins, which may generate a three times multiplier payout, twelve free spins, and/or 100 additional credits.

In another example, a wagering option may be that an $n^{th}$ payline may be a winning payline within seven spins, which may generate a four times multiplier payout, eight free spins, and/or 150 additional credits. Any combination of multiplier payout (e.g., 1× to $n^{th}$×), free spins (e.g., 1 to N), and/or credits (e.g., 1 to N) may be utilized.

In one example, when a player wins a line or pattern, the player may be given the option to make a side bet that they will hit the same pattern again within a predetermined period or a predetermined number of spins.

FIG. 5D is an illustration of a pattern paytable 572 for electronic gaming device 100, according to one embodiment. For example, a wagering option may be that two or more paylines and/or symbol structures are generated within a specific time and/or number of spins. For example, a wagering option may be that winning events on the first payline and the second payline will occur during the next five minutes (and/or number of spins) with a payout including a multiplier, free spins, and/or additional credits.

In another example, a wagering option may be that winning events on the third payline, the fifth payline, and the seventh payline will occur during the next ten minutes (and/or number of spins) with a payout including a multiplier, free spins, and/or additional credits.

In another example, a wagering option may be that a four corner pattern will be generated on electronic gaming device 100 and/or electronic gaming system 200 within the next thirty minutes (and/or number of spins) with a payout including a multiplier, free spins, and/or additional credits. A four corner pattern may be where a first symbol 576 is located in all four corners of the plurality of reels (see FIG. 5E).

In another example, a wagering option may be that a full board pattern will be generated on electronic gaming device 100 and/or electronic gaming system 200 within the next two hours (and/or number of spins) with a payout including a multiplier, free spins, and/or additional credits. A full board pattern may be where all of the symbols on the plurality of reels are the same symbol.

In another example, a wagering option may be that winning events on the first payline, the third payline, the fifth payline, the sixth payline, the seventh payline, and tenth payline will occur during the next twenty minutes (and/or number of spins) with a payout including a multiplier, free spins, and/or additional credits.

In another example, a wagering option may be that a center square pattern will be generated on electronic gaming device 100 and/or electronic gaming system 200 within the next twenty minutes (and/or number of spins) with a payout including a multiplier, free spins, and/or additional credits. A center square pattern may be where a second symbol 578 is located in the center of the plurality of reels to form a square (see FIG. 5E).

Figures 6A, 6B:
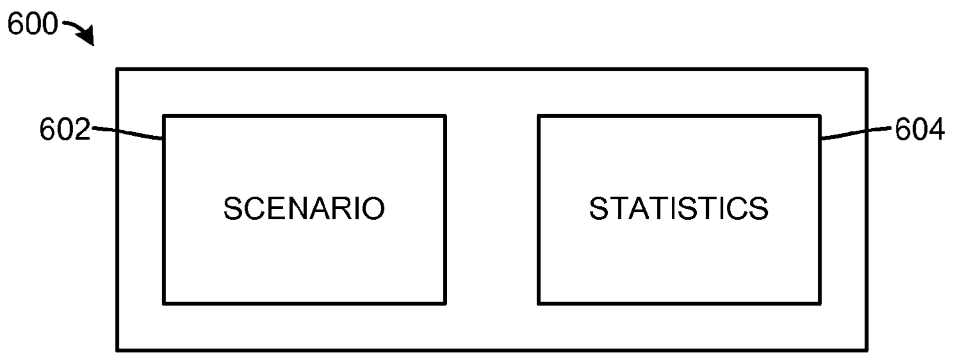
FIG. 6A is a block diagram for a scenario module and a statistics module, according to one embodiment.
FIG. 6B is an illustration of data relating to winning events, according to one embodiment.

FIG. 6A is a block diagram 600 for a scenario module and a statistics module, according to one embodiment. Block diagram 600 may include a scenario database 602 and a statistics database 604. Statistics database 604 may be utilized to display historical game data (e.g., the last fifty winning events). For example, the data may demonstrate that first payline comprised 40% of the last fifty winning events, second payline comprised 20% of the last fifty winning events, third payline comprised 10% of the last fifty winning events, fourth payline comprised 18% of the last fifty winning events, and fifth payline comprised 12% of the last fifty winning events. This represents that first payline has been a winner 40 percent of the time during the last fifty winning events.

Scenario module 602 may be utilized to display historical game data (e.g., the last one hundred winning events for patterns). For example, the data may demonstrate that the combination of the first payline and the second payline winning within a specific time period (or number of spins) occurred five percent of the time during the last one hundred winning events. In another example, the data may demonstrate that the combination of the first payline, the second payline, and the fifth payline winning within a specific time period (or number of spins) occurred one percent of the time during the last one hundred winning events.

In FIG. 6B, another illustration 610 of data relating to winning events is shown, according to one embodiment. In this example, the data may demonstrate that the first payline has a winning event thirty percent of the time over a specific period. In another example, the data may demonstrate that the second payline has a winning event twenty percent of the time over a specific period. In another example, the data may demonstrate that the third payline has a winning event ten percent of the time over a specific period. In another example, the data may demonstrate that the fourth payline has a winning event eighteen percent of the time over a specific period. In another example, the data may demonstrate that the fifth payline has a winning event twelve percent of the time over a specific period. In another example, the data may demonstrate that the $n^{th}$ payline has a winning event five percent of the time over a specific period. In another example, the data may demonstrate that the four corner pattern has a winning event five percent of the time over a specific period.

In another example, the representative information may show that the first payline has been a winner 40 percent of the time, the second payline has been a winner 20 percent of the time, the third payline has been a winner 5 percent of the time, the fourth payline has not been a winner, the fifth payline has been a winner 25 percent of the time, and there has been no winner 10 percent of the time.

The data may include the size of the wagers that the various players have placed on one or more gaming options and/or the percentage of time it was played. For example, the data may show that 30% of players have played max bet (either points or money), 10% of players have wagered minimum bet, etc. In another example, the data may show that 25% of the players wagered $5 on the first payline repeating within five spins. In another example, the data may show that 13% of the players wager $1 on the first payline and the second payline having winning events within ten minutes and that 50% of the time this was a winning wager.

The data may include the size of the jackpot which was won. For example, it may show that the last number (e.g., 5, 10, 15, or etc.) of jackpots paid by the machine were a certain amount (e.g., $1,000, $10,000, $1,000,000, etc.). The data may include how long the last number of players (e.g., 1, 5, 10, 15, or some other number) played on electronic gaming device 100.

Based on information displayed on electronic gaming device 100 and/or electronic gaming system 200, a player may place a wager or bet on the reoccurrence of a pattern and/or scenario (e.g., the first payline is a winner, the second payline is a winner, etc.) to repeat one or more times. For example, a wager may be placed that winning events on the first payline will occur two times over the next ten spins (or time period). In another example, a player may place a wager on the reoccurrence of a pattern (e.g., the first payline and the second payline are winners twice over the next twenty spins (or time period); the first payline and the tenth payline are winners three times over the next fifty spins (or time period); the first payline will have two winning events during the next ten spins while the third payline will have one winning event during the next three spins, and the fifth payline will have three winning events during the next fifty spins, etc.). The expectation for repeating one or more paylines and/or one or more patterns may be randomly predetermined at the time the wager is made. The expectation for repeating one or more paylines and/or one or more patterns may be over a fixed predetermined period. The expectation for repeating one or more paylines and/or one or more patterns may be over a number of plays (e.g. 5 plays, 10 plays, etc.). The expectation for repeating one or more paylines and/or one or more patterns may be over an amount of time (e.g. 5 minutes, 10 minutes, etc.). The expectation for repeating one or more paylines and/or one or more patterns may be over any trackable events and/or combination thereof.

The reoccurrence of a winning repeat payline and/or pattern over a determined period may provide the player with a super multiplier award, super free spins, and/or super additional credits for that event happening more than one time in the determined period (e.g., number of spins, 5 minutes, 10 minutes, an hour, during the player's continues session, during the player's session for a day, a week, etc.). For example, if a player wagers that a winning event on the first payline will reoccur after already winning a repeat payline payout of the first payline, then the award (e.g., multiplier, free spins, and/or additional credits) may be modified into a super award. The super award may increase the award. For example, the player may bet that the second payline will have another winning event during the next six spins. If the second payline is a winner during the next six spins, then the player may obtain a 2× multiplier. If the player continues to bet that second payline will have another winning event during the next five spins, then if the second payline has a winning event during the next five spins the multiplier may be a 5× multiplier. If the player continues to bet that second payline will have a winning repeat payline during the next seven spins and a winning event occurs during these seven spins, then the multiplier may be increased (e.g., 10×, 15×, etc.).

In another example, if the player bets that the first payline will have a repeat payline win in the next 10 spins and the first payline has a repeat payline winning event three times in the next 10 spins the player may receive 2 times the payout on the first occurrence, 4 times the payout on the second occurrence, and 10 times the payout on the third occurrence. Any combination of reoccurrence and multiplier is within the scope of this disclosure.

The player placing a wager on more than one scenario may increase the award. The player placing a wager on more than one scenario may increase the multiplier. For example, if the player selects that the first payline will have a winning event during the next ten spins (or time period) and that the winning symbols will be cherries (the odds of both of these occurring is lower than either one happening independently) the award may be increased. In this case, the player may qualify for a 10× multiplier vs. only the 3× multiplier that may be available for each event occurring independently. In these examples, any award may generate multipliers, frees spins, additional credits, and/or any other prize.

In FIG. 6C, a bingo card 620 is shown, according to an exemplary embodiment. This disclosure may be utilized with a bingo card game play.

In FIG. 6D, an illustration of a game status image 630 is shown, according to one embodiment. In this example, a pattern wager may have been made that requires winning events to occur on the first payline, the second payline, the third payline, the fourth payline, the fifth payline, the sixth payline, and the seventh payline over various time periods. In this example, game status image 630 may show that a winning event has occurred on the first payline and the fourth payline. Further, no winning event has occurred on the second payline and that the second payline still has three minutes to generate a winning event. In addition, no winning event has occurred on the third payline and that the third payline still has five minutes to generate a winning event. No winning event has occurred on the fifth payline and only ten seconds remain for a winning event to be generated on the fifth payline. Further, no winning event has occurred on the sixth payline and twenty minutes remain for a winning event to be generated on the sixth payline. Lastly, no winning event has occurred on the seventh payline and only fifty seconds remain for a winning event to be generated on the seventh payline. In this example, the time period may be replaced by a number of spins remaining.

The completion or status of an activity may be shown by filling in a space (e.g., YES and/or NO), covering up, crossing-out, or using some method to indicate that the particular task has been completed.

The player award may include free play on electronic gaming device 100, entering into a bonus round, a voucher, a jackpot, a payout, another item of value, and/or any combination of awards.

In another example, the player may place a wager that the second payline and the third payline will be winning paylines over the next five spins. If the second payline is a winning payline, the second payline may be covered. Therefore, the player still needs to cover the third payline to win the prize.

Indication that the payline is covered may be done with a replication of the winning symbols, which occurred to cover the payline. Indication that the payline is covered may be done with a table indicating which paylines are completed. Indication that the payline is covered may be done by showing a payline in a different color and/or shading. Indication that the payline is covered may be done in any way that allows a player to differentiate the covered lines from the uncovered lines.

Figure 7A:
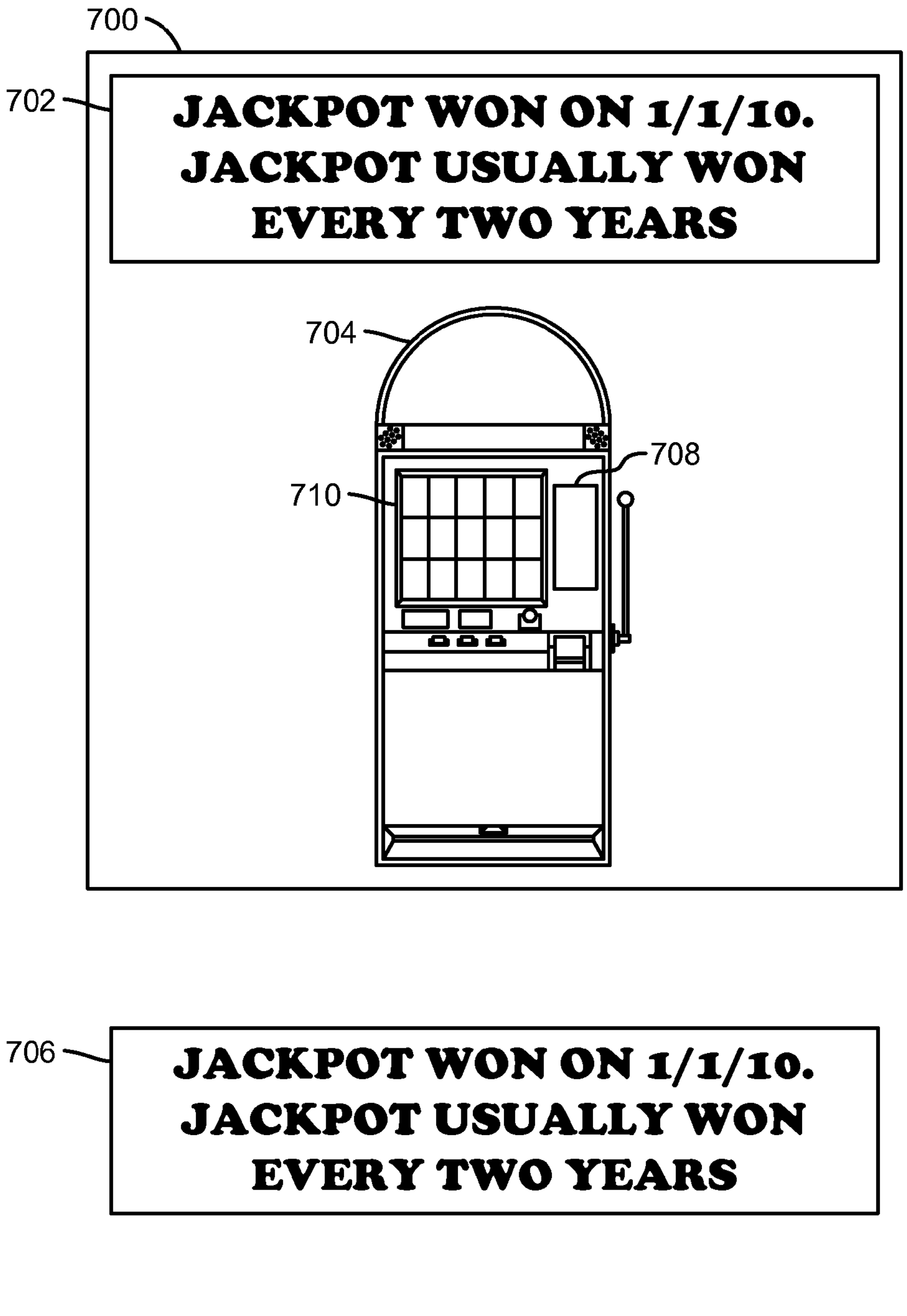
FIG. 7A is an illustration of a gaming entity which allows for the disclosure of data relating to the historical frequency of winning an award, according to one embodiment.

FIG. 7A is an illustration of an image to disclose data relating to the historical frequency of winning an award, according to one embodiment. In this example, a gaming entity 700 may include an internal display device 702, electronic gaming device 100, and/or an external display device 706. Electronic gaming device 100 may include a top display 704, a main display 710, and/or a side display 708. A historical gaming data message 706 may be displayed on internal display device 702, top display 704, side display 708, main display 710, and/or external display 706. Historical gaming data message 706 may be any message, which provides historical gaming data. For example, historical gaming data message 706 may state "Jackpot won on Jan. 1, 2010. Jackpot usually won every two years." In another example, historical gaming data message 706 may state "Jackpot won on Jan. 1, 2010. Jackpot usually won every two years. The Jackpot is due to be won by Jan. 1, 2012." In another example, historical gaming data message 706 may state "On average, this Jackpot is due to be won."

FIG. 7B is a database 750 for data relating to the historical frequency of winning an award, according to one embodiment. In this example, a first gaming device may have had a $1,000,000 jackpot won on Jan. 10, 2010. This jackpot was won 1400 days ago and on average is won every 1500 days. Therefore, the anticipated next winning date is Feb. 18, 2014.

In another example, a second gaming device may have had a $5,000,000 jackpot won on Jan. 1, 2010. This jackpot was won 1410 days ago and on average is won every 1000 days. Therefore, the anticipated next winning date is Sep. 27, 2012.

In another example, an $n^{th}$ gaming device may have had a $10,000,000 jackpot won on Dec. 1, 2009. This jackpot was won 1440 days ago and on average is won every 2000 days. Therefore, the anticipated next winning date is May 24, 2015.

The display of the message may occur during live play and/or in a tracking mode. The message may be related to a specific machine, a specific title, a specific theme, and/or any linked titles and/or themes.

Figure 8:
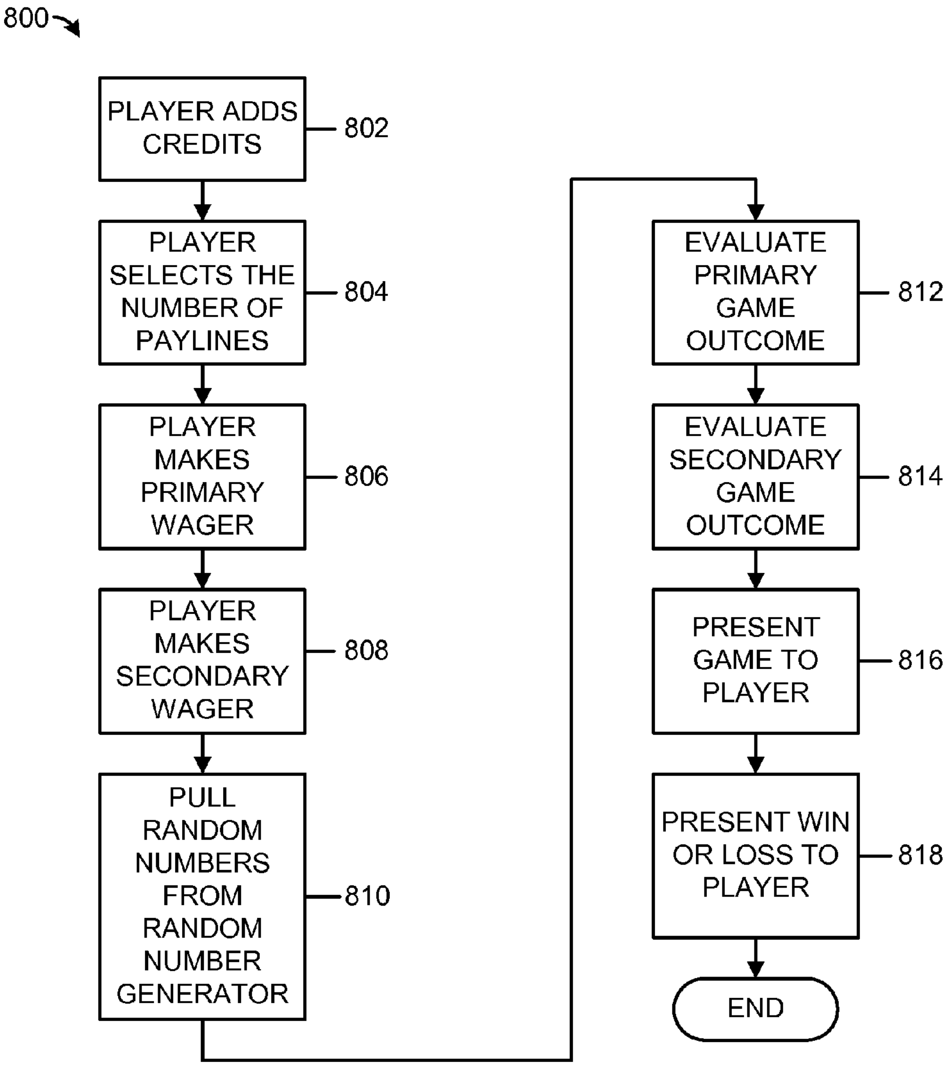
FIG. 8 is a flow diagram for wagering on game play, according to one embodiment.

In FIG. 8, a wagering flow diagram 800 is shown. The method may include the starting of the game. The method may include the player adding credits to electronic gaming device 100 (step 802). The method may include a selection of one or more paylines (step 804). The method may include the player making a primary wager on one or more paylines (step 806). The method may further include the player making a secondary wager on one or more paylines repeating (step 808). The method may include electronic gaming device 100 and/or electronic gaming system 200 pulling random numbers from the random number generator (step 810). The method may include the evaluation of the game outcome for the primary wager (step 812). The method may further include the evaluation of the game outcome for the secondary wager (step 814). The method may include presenting the game play to the player (step 816). The method may include presenting the game outcome (win or loss) to the player (step 816). The method may then end.

Figure 9:
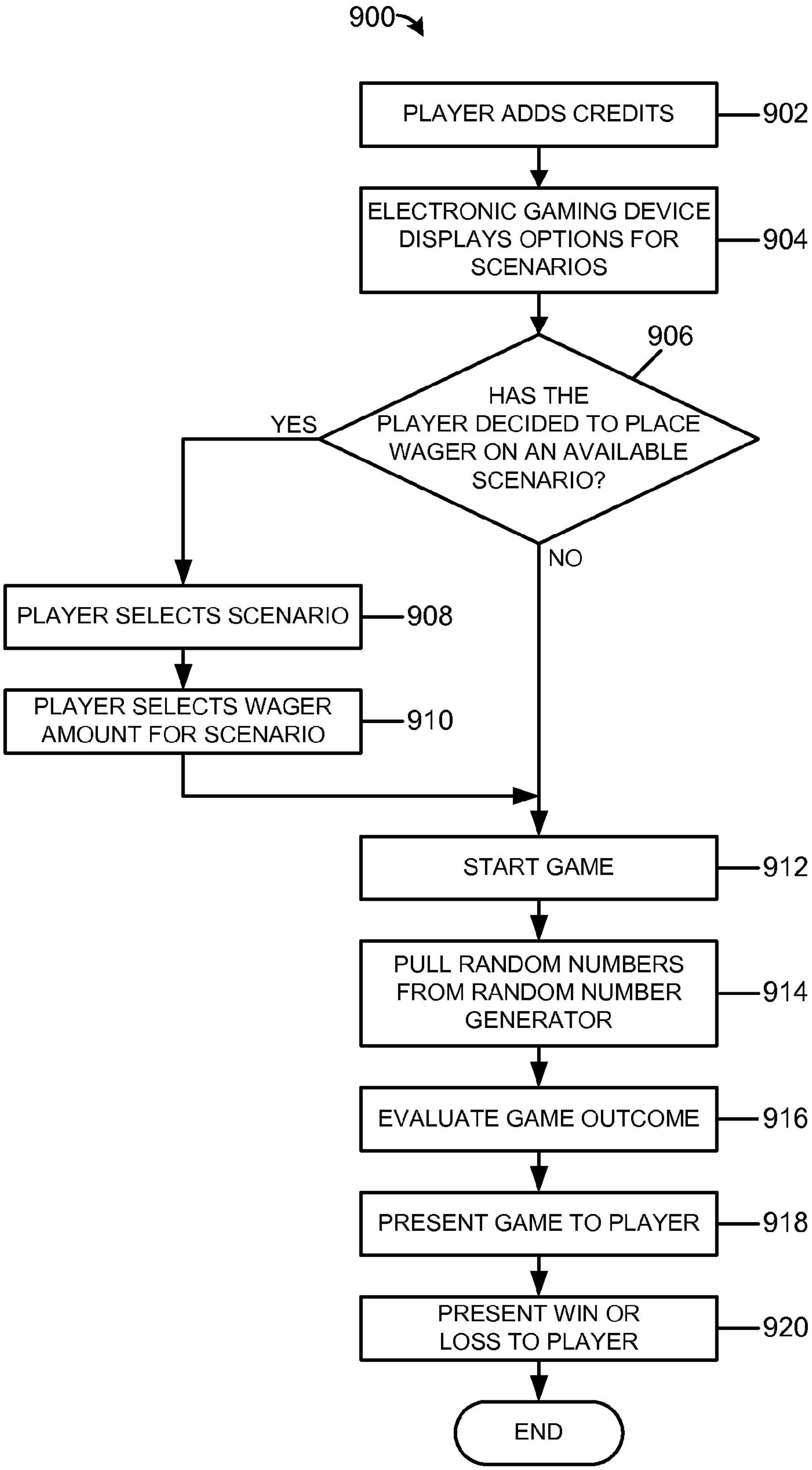
FIG. 9 is a flow diagram for game play relating to available scenarios, according to one embodiment.

In FIG. 9, an available scenario game play flow diagram 900 is shown. The method may include the player adding credits to electronic gaming device 100 (step 902). The method may further display scenario options (e.g., patterns, repeat paylines, etc.) for the player to place wagers (step 904). The method may include electronic gaming device 100 and/or electronic gaming system 200 determine whether the player has decided to place a wager on an available scenario (step 906). If the player does not want to wager on an available scenario, then the method may start the game (step 912). If the player wants to place a wager on an available scenario, then the player may select one or more scenarios (step 908). The player may select an amount to wager on the one or more scenarios (step 910). The method may start the game (step 912). The method may include electronic gaming device 100 and/or electronic gaming system 200 pulling random numbers from the random number generator (step 914). The method may include the evaluation of the game outcome (step 916). The method may include presenting the game play to the player (step 918). The method may include presenting the game outcome (win or loss) to the player (step 920). The method may then end.

Figure 10:
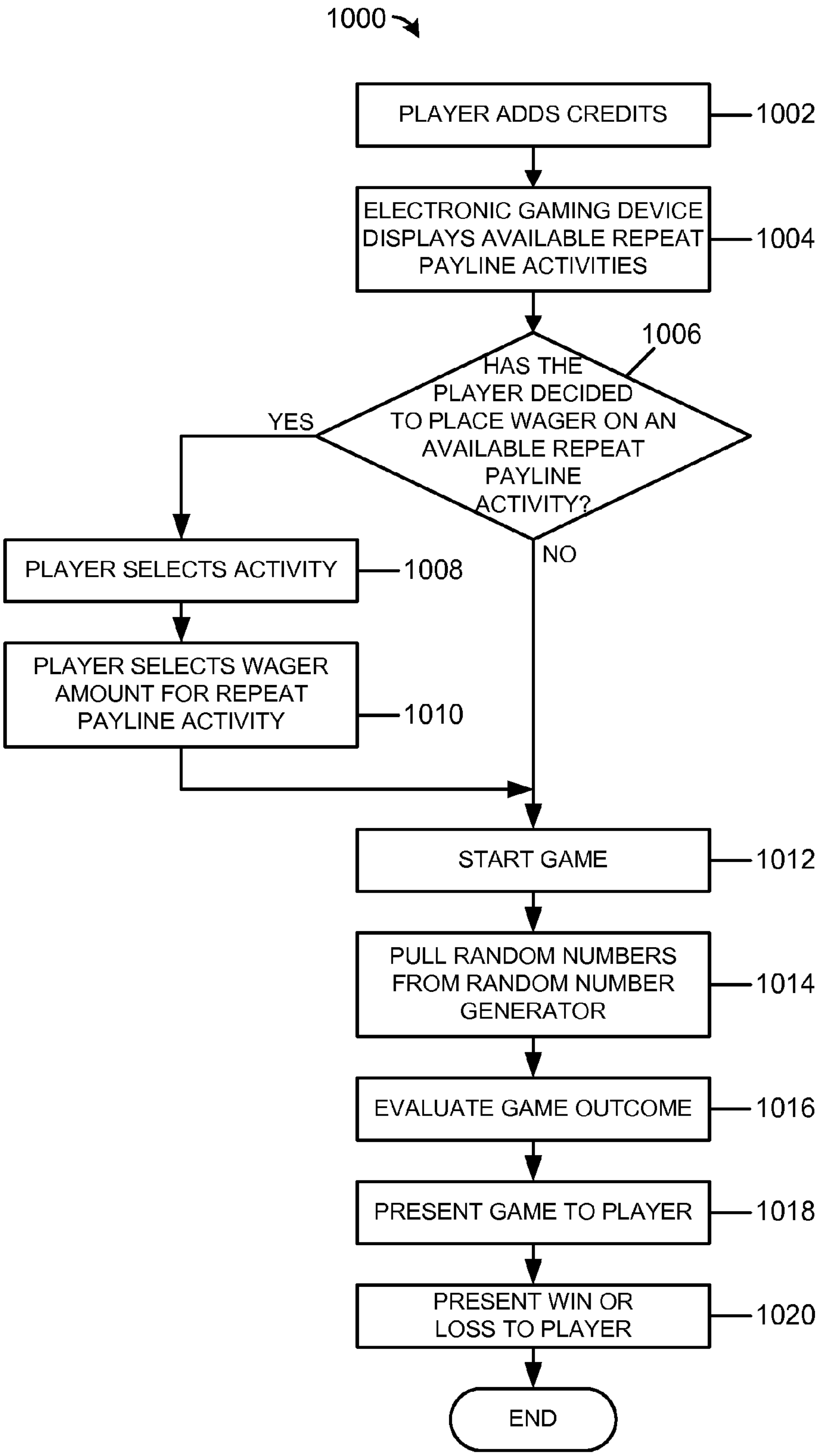
FIG. 10 is a flow diagram for game play relating to one or more repeat paylines, according to one embodiment.

In FIG. 10, a flow diagram for game play relating to one or more repeat paylines 1000 is shown. The method may include the player adding credits (step 1002). The method may include electronic gaming device 100 and/or electronic gaming system 200 displaying the available repeat payline activities (step 1004). The method may include electronic gaming device 100 and/or electronic gaming system 200 determining whether a player wants to place a wager on one or more available repeat payline activities (step 1006). If the player does not want to wager on one or more available repeat payline activities, then the method may start the game (step 1012). If the player wants to place a wager on one or more available repeat payline activities, then the player may select one or more repeat payline activities (step 1008). The player may select an amount to wager on the one or more repeat payline activities (step 1010). The method may start the game (step 1012). The method may include electronic gaming device 100 and/or electronic gaming system 200 pulling random numbers from the random number generator (step 1014). The method may include the evaluation of the game outcome (step 1016). The method may include presenting the game play to the player (step 1018). The method may include presenting the game outcome (win or loss) to the player (step 920). The method may then end.

Figure 11:
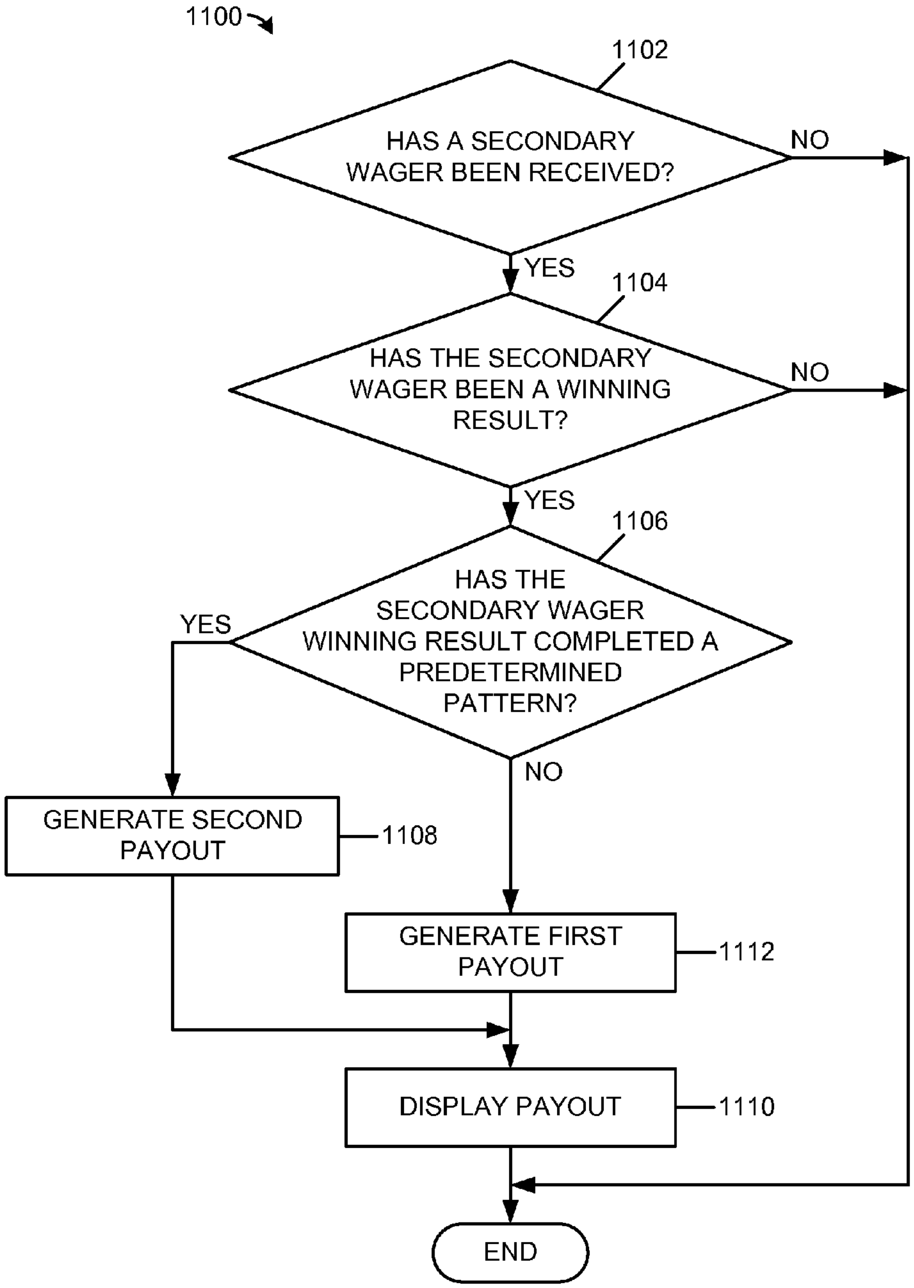
FIG. 11 is a flow diagram for determining a winning outcome, according to one embodiment.

In FIG. 11, a flow diagram for determining a winning outcome 1100 is shown. The method may include the starting of the game. The method may include electronic gaming device 100 and/or electronic gaming system 200 determining whether a secondary wager has been placed (step 1102). If no secondary wager has been placed, then the method may end. If a secondary wager has been placed, the method may include electronic gaming device 100 and/or electronic gaming system 200 determining whether a secondary wager has resulted in a winning outcome (step 1104). If the secondary wager has not resulting in a winning outcome, the method may end. If the secondary wager has resulted in a winning outcome, the method may include electronic gaming device 100 and/or electronic gaming system 200 determining whether the secondary winning result completed a predetermined pattern (step 1106). If the secondary winning result has not completed a predetermined pattern, then the method may generate a first payout based on the winning result (step 1112). If the secondary winning result has completed a predetermined pattern, then the method may generate a second payout based on the completion of the predetermined pattern (step 1108). The method may include displaying the first payout and/or the second payout (step 1110). The method may end.

For example, the predetermined pattern may be a four corner pattern where a first symbol 576 is located in all four corners of the plurality of reels (see FIG. 5E). In another example, the predetermined pattern may be winning events occurring on the first payline, the second payline, and the third payline during the next ten spins (or time period).

Figure 12:
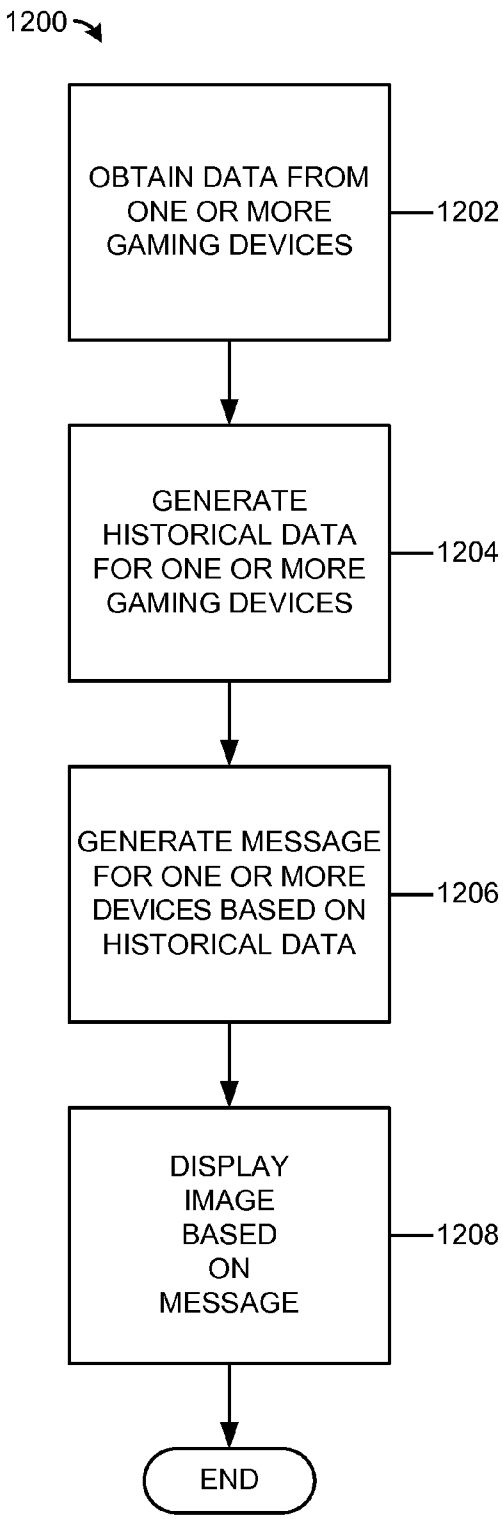
FIG. 12 is a flow diagram for displaying historical gaming data, according to one embodiment.

FIG. 12 is a flow diagram for displaying historical gaming data 1200, according to one embodiment. The method may include obtaining data from one or more gaming devices (step 1202). The method may also include generating historical data for the one or more gaming devices (step 1204). The method may include generating a message for the one or more gaming devices based on the historical data (step 1206). The method may include displaying an image based on the message (step 1208).

Figure 13:
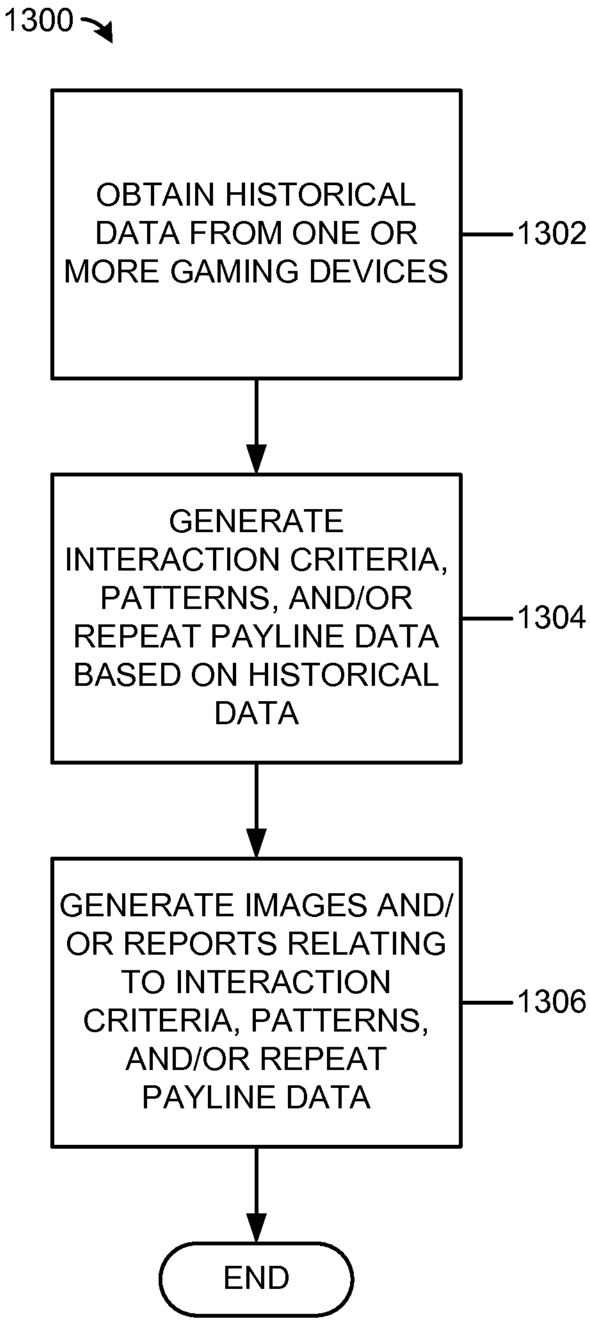
FIG. 13 is a flow diagram for generating interaction criteria, patterns, and/or repeat payline data, according to one embodiment.

FIG. 13 is a flow diagram for generating interaction criteria, patterns, and/or repeat payline data 1300, according to one embodiment. The method may include obtaining historical data from one or more gaming devices (step 1302). The method may include generating interaction criteria, patterns, and/or repeat payline data based on the historical data (step 1304). The method may include generating images and/or reports relating to the generated interaction criteria, patterns, and/or repeat payline data (step 1306).

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on a selected payline occurrence.

In another embodiment, a method of game play may include receiving one or more primary wagers on one or more paylines. The method may include receiving a secondary wager on one or more paylines (e.g., repeat paylines, patterns, scenarios, etc.). The selected payline may be based on selection data. The selection data may be based on player input. The method may include determining one or more primary wager payouts. Further, the method may include determining one or more secondary wager payouts.

In another example, the method may include obtaining a player preference data and modifying a game configuration based on the player preference data. The method may include receiving data from at least one of a server and one or more gaming devices. The method may include multiplying a prize value based on a selected payline occurrence.

In another embodiment, the electronic gaming system may include a server. The server may include a server memory and a server processor. The server may receive primary wagers on one or more paylines. The server processor may receive one or more secondary wagers on one or more selected paylines (e.g., repeat paylines, patterns, scenarios, etc.). The selected paylines may be based on data received from a player. The server processor may determine a selected paylines payout based on the one or more selected paylines. The server memory may include a payline module. The payline module may include a plurality of payline structures.

In another example, the server processor may determine a payout based on the primary wagers. The server processor via a display may display one or more selected paylines. The display may shade one or more non-selected paylines.

In one embodiment, the electronic gaming device may include a plurality of reels. The plurality of reels may include a plurality of symbols. One or more paylines may be formed on a portion of the plurality of reels. The electronic gaming device may include a memory. The memory may include a payline module. The payline module may include a plurality of payline structures. The electronic gaming device may include a processor, which receives primary wagers on one or more paylines. The processor may also receive one or more secondary wagers on one or more repeat paylines. The processor may determine one or more repeat payline payouts based on the one or more repeat paylines.

In another example, the processor may determine a payout based on the primary wagers. The processor may receive one or more secondary wagers on one or more patterns. The electronic gaming device may include a display, which may display a game status image.

In another example, the display may shade one or more completed repeat paylines. The electronic gaming device may include a player preference input device. The player preference input device may modify a game configuration based on data from an identification device. In another embodiment, the processor may multiply a prize value based on a repeat payline occurrence.

In an embodiment, a method may include receiving one or more primary wagers on one or more paylines. The method may include receiving a secondary wager on one or more repeat paylines. The method also may include determining one or more primary wager payouts. The method may include determining one or more secondary wager payouts.

In another example, a primary wager payout may be based on the one or more paylines and a secondary wager payout may be based on the one or more repeat paylines. The method may include receiving one or more secondary wagers on one or more patterns.

In another example, the method may include displaying a game status image. The method may also include shading one or more completed repeat paylines.

In another example, the method may include displaying paylines based on the one or more primary wagers. The method may include displaying the one or more repeat paylines. The method may include highlighting one or more repeat paylines. The method may include obtaining a player preference data and modifying a game configuration based on the player preference data.

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

This repeat payline feature, the pattern feature, and/or the scenario feature may be part of the base game and/or a bonus game. In addition, this repeat payline feature, the pattern feature, and/or the scenario feature may be part of a base bet and/or may require an additional side bet (e.g., ante bet).

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
- a display device;
- a wager accepting device configured to accept an item associated with a monetary value, thereby creating a credit balance;
- a cashout device configured to receive an input to cause an initiation of game machine payout associated with the credit balance;
- a memory device;
- a processor; and
- machine-readable code stored in the memory device and executable by the processor to:
- in response to placement of a first game wager and an optional wager, reduce said credit balance based upon said first game wager and said option wager and present a first game comprising:
  - causing said display device to display a first plurality of game symbols;
  - evaluating said first plurality of game symbols along a plurality of paylines for first game winning combinations of said first plurality of game symbols;
  - awarding one or more first game payouts for said first game winning combinations of said first plurality of game symbols; and
  - increasing said credit balance by said one or more first game payouts; and
- in response to placement of a second game wager, reduce said credit balance based upon said second game wager and present at least one second game comprising:
  - causing said display device to display a second plurality of game symbols;
  - evaluating said second plurality of game symbols along the plurality of paylines for second game winning combinations of said second plurality of game symbols;

- awarding one or more second game payouts for said second game winning combinations of said second plurality of game symbols; and
  - increasing said credit balance by said one or more second game payouts; and
- determining if at least one optional wager winning condition exists based on placement of said optional wager prior to presenting the first game comprising a winning combination of said second game winning combinations of said second plurality of game symbols which is the same as a winning combination of said first game winning combinations of said first plurality of game symbols along at least one same designated payline of the plurality of paylines in said first game and said at least one second game;
- awarding one or more optional wager payouts in the event of at least one optional wager winning condition, wherein the one or more optional wager payouts comprises multiplying the one or more second game payouts by a multiplier;
- increasing said credit balance based upon said one or more optional wager payouts; and
- detect the input to cause the initiation of the game machine payout, via the cashout device.

2. The electronic gaming device of claim 1 wherein said at least one same designated payline is player selected.

3. The electronic gaming device of claim 1 wherein said step of determining comprises determining if said at least one optional wager winning condition exists in the second game which succeeds said first game.

4. The electronic gaming device of claim 1 wherein said step of determining comprises determining if said at least one optional wager winning condition exists in at least one of a plurality of second games which succeed said first game.

5. The electronic gaming device of claim 1 wherein said processor is configured to cause said display device to highlight said at least one same designated payline.

6. The electronic gaming device of claim 1 wherein said first plurality of game symbols and said second plurality of game symbols both comprise a matrix of N×M game symbols where N and M are both greater than 2.

7. The electronic gaming device of claim 1 wherein a value of said multiplier varies depending upon said designated payline.

8. The electronic gaming device of claim 1 wherein second game winning combinations of said second plurality of game symbols which is the same as a winning combination of said first game winning combinations of said first plurality of game symbols comprises a plurality of identical game symbols.

9. A method of playing a game via an electronic gaming device comprising:
- accepting an item associated with a monetary value via a wager accepting device of said electronic gaming device, thereby creating a credit balance;
- accepting placement of a first game wager and an optional wager;
- reducing said credit balance based upon said first game wager and said option wager;
- present a first game comprising:
  - causing a display device of said electronic gaming device to display a first plurality of game symbols;
  - evaluating said first plurality of game symbols along a plurality of paylines for first game winning combinations of said first plurality of game symbols;

awarding one or more first game payouts for said first game winning combinations of said first plurality of game symbols; and increasing said credit balance by said one or more first game payouts; and accepting placement of a second game wager;

reducing said credit balance based upon said second game wager;

presenting at least one second game comprising:

causing said display device to display a second plurality of game symbols;

evaluating said second plurality of game symbols along the plurality of paylines for second game winning combinations of said second plurality of game symbols;

awarding one or more second game payouts for said second game winning combinations of said second plurality of game symbols; and increasing said credit balance by said one or more second game payouts; and determining if at least one optional wager winning condition exists based on placement of said optional wager prior to presenting the first game comprising a winning combination of said second game winning combinations of said second plurality of game symbols which is the same as a winning combination of said first game winning combinations of said first plurality of game symbols along at least one same designated payline of the plurality of paylines in said first game and said at least one second game;

awarding one or more optional wager payouts in the event of at least one optional wager winning condition, wherein the one or more optional wager payouts comprises multiplying the one or more second game payouts by a multiplier;

increasing said credit balance based upon said one or more optional wager payouts; and detecting an input to a cashout device of said electronic gaming machine to cause an initiation of a game machine payout associated with said credit balance.

10. The method of claim 9 further comprising receiving an input regarding a selection of said at least one same designated payline.

11. The method of claim 9 wherein said step of determining comprises determining if said at least one optional wager winning condition exists in the second game which succeeds said first game.

12. The method of claim 9 wherein said step of determining comprises determining if said at least one optional wager winning condition exists in at least one of a plurality of second games which succeed said first game.

13. The method of claim 9 further comprising causing said display device to highlight said at least one same designated payline.

14. The method of claim 9 wherein said first plurality of game symbols and said second plurality of game symbols both comprise a matrix of N×M game symbols where N and M are both greater than 2.

15. The method of claim 9 wherein a value of said multiplier varies depending upon said designated payline.

* * * * *